United States Patent [19]

Aruga et al.

[11] Patent Number: 5,911,527
[45] Date of Patent: Jun. 15, 1999

[54] HYBRID PRINTER DEVICE EQUIPPED WITH A PLURALITY OF PRINTING MECHANISMS AND CONTROL METHOD THEREFORE

[75] Inventors: Kazuhisa Aruga; Naohiko Koakutsu, both of Suwa, Japan

[73] Assignee: Seiko Epson Corporation, Tokyo, Japan

[21] Appl. No.: 08/922,037

[22] Filed: Sep. 2, 1997

[30] Foreign Application Priority Data

Sep. 2, 1996 [JP] Japan .................................. P8-232325

[51] Int. Cl.⁶ ........................................................ B41J 1/50
[52] U.S. Cl. ............................ 400/149; 400/150; 400/74
[58] Field of Search ........................ 400/120.16, 120.17, 400/124.08, 149, 150, 171, 703, 74

[56] References Cited

U.S. PATENT DOCUMENTS

| | | | |
|---|---|---|---|
| 4,684,269 | 8/1987 | Miki | 400/82 |
| 4,874,264 | 10/1989 | Suzuki et al. | |
| 5,330,274 | 7/1994 | Schimmelpfennig et al. | 400/82 |
| 5,452,959 | 9/1995 | Oka | 400/149 |
| 5,800,081 | 9/1998 | Teradaira et al. | 400/703 |

FOREIGN PATENT DOCUMENTS

| | | |
|---|---|---|
| 0 654 757 | 5/1995 | European Pat. Off. . |
| 0 729 113 | 8/1996 | European Pat. Off. . |
| 58-062056 | 4/1983 | Japan . |
| 60-49973 | 3/1985 | Japan . |
| 1-242282 | 9/1989 | Japan . |
| 6-11565 | 2/1994 | Japan . |

*Primary Examiner*—John Hilten
*Attorney, Agent, or Firm*—Mark P. Watson

[57] ABSTRACT

A hybrid printer has mounted thereon a plurality of printing mechanisms and error processing appropriate to the respective printing mechanisms with differing functions and appropriate to the printing paper can be performed. Thermal printer state detector 65 and wire dot printer state detector 66 are provided which have the capability of detecting the respective states of thermal printing mechanism 10 and wire dot printing mechanism 20 mounted on hybrid printer 1. Further, printing mechanism selector 71 is capable of determining the printing mechanism selected from command data indicating the type paper. This makes it possible for state determination member 72 to know the error status of each printing mechanism and to determined which printing mechanism is in operation, and therefore it is possible to quickly perform error processing appropriate to the printing mechanism.

17 Claims, 5 Drawing Sheets

HYBRID PRINTER DEVICE EQUIPPED WITH A PLURALITY OF PRINTING MECHANISMS AND CONTROL METHOD THEREFORE

BACKGROUND OF THE INVENTION

1. Field of the Invention

This invention relates to the control and configuration of a compound printer whereon two or more printing mechanisms are mounted.

2. Background of the Invention

When the cover of a printer is opened during printing to change or add printing paper, subsequent printing processing cannot be assured. Because of this, a personal computer or other host device is notified of the printer status by sending a busy signal indicating that the processing of data being transferred cannot be assured. Specifically, many printers indicate this busy state by making the data terminal ready (DTR) signal inactive. The printer also executes error processing that interrupts printing after completing printing of the line in progress because it cannot be guaranteed that printing can be continued after the cover is opened.

Hybrid printers having two or more printing mechanisms as shown in FIG. 3 have been recently developed. A hybrid printer 1 will typically have non-impact type thermal printing mechanism 10 and impact type wire dot printing mechanism 20 as well as control circuit 30 with functions to control printing mechanisms 10 and 20 based on data transferred from a host device. Thermal printing mechanism 10 comprises thermal head 11, paper feed roller 13 for feeding thermal paper (roll paper) 12 to thermal head 11, and paper feed motor 14 and speed reducing gear 15 for driving paper feed roller 13. Wire dot printing mechanism 20 comprises print head (wire dot head) 24 disposed opposite platen 21 with ribbon 22 between them and moved left and right by carriage 23 driven by a motor not shown in the figure, paper feed roller 26 for feeding slip form 25 to the print head 24, and slip form feed motor 27 and gear set for driving paper feed roller 26.

In this type of hybrid printer 1, customer receipts, for example, are printed on thermal paper 12, which is provided in rolls, using thermal printing mechanism 10, and slip forms 25 such as checks and vouchers are printed using wire dot printing mechanism 20. Two different types of documents can therefore be printed on one printer 1, thus making the printer useful for point-of-sale (POS) terminals. Variations in printing can be considered such as using thermal printing mechanism 10 for printing journals for preserving store sales records and using wire dot printing mechanism 20 to perform authentication printing, in which case four types of printing operations could be performed in one printer.

A hybrid printer having two such types of printing mechanisms requires that a new control method for error processing be developed. For example, it is desirable to perform one type of error processing when cover 19 of thermal printing mechanism 10 is opened to add paper and perform another type of error processing when cover 29 of wire dot printing mechanism 20 is opened to replace ribbon 24.

For example, since feeding of the paper in thermal printing mechanism 10 is performed by turning the platen, it is desirable to stop printing immediately when it is detected that the cover has been opened and the platen has moved away from the paper. However, since printing can be continued in wire dot printing mechanism 20 even if opening of the cover is detected, if for a short period, it is desirable to complete printing of the line being printed in order to preserve data.

Also, when the cover is closed following stopping printing due to opening of the cover, form feeding before starting printing cannot be performed in thermal printing mechanism 10 because roll paper is used. However, when slip forms are used in wire dot printing mechanism 20, it is desirable that printing be restarted by setting slip form 25 at the printing location after form feed processing.

If a busy signal is output when one of the printing mechanism covers is opened in a prior hybrid printer wherein two printing mechanisms are integrated, data can no longer be transferred from the host device to the hybrid printer even if the other printing mechanism is operable. Therefore, in order to effectively utilize a plurality of integrated printing mechanisms, it is desirable to output busy signals corresponding to the respective states of the integrated printing mechanisms.

OBJECTS OF THE INVENTION

It is an object of the present invention to provide a mechanism and control method suited to a hybrid printer wherein a plurality of printing mechanisms are integrated; that is, to provide a mechanism and control method capable of quickly performing error processing suited to the respective printing mechanisms. Further, it is an object of the present invention to provide a hybrid printer and control method capable of effectively utilizing a hybrid printer wherein a plurality of printing mechanisms are integrated and preventing such problems as loss of data transferred from a host device.

SUMMARY OF THE INVENTION

The present invention is configured such that only the state of the printing mechanism selected by the host device is considered and processing by the entire printer is not hindered by another non-selected printing mechanism. The present invention features a printer device that performs printing processing based on data received from a host device and comprises first and second printing mechanisms each equipped with independent printer heads and that perform printing on mutually differing types of recording mediums, first and second state detectors that detect the states of the first and second printing mechanisms, respectively, a printing mechanism selector that selects one printing mechanism of the first and second printing mechanisms based on the data from the host device, a state determination member that determines the state of the printer device based on the state of the printer selected by the printing mechanism selector, and a state notification member that notifies the host device of the state of the printer device determined by the state determination member.

In the present invention, the host device is notified of the state of the printing mechanism selected by the host device via data from the host device, and therefore the operation of the host device is not affected by the state of printer mechanisms other than the printing mechanism selected by the host device.

It is desirable that the state determination member determine the state of the printer device based on the states of the first and second printing mechanisms if the states of the first and second printing mechanism do not conflict with each other. This allows the host device to accurately recognize the respective states of each printing mechanism, and it is possible to perform appropriate processing as required based on determinations by the host device.

The printing mechanism selector may select the printing mechanism to perform printing processing based on data from the host device. By notifying the host device of the state of the printing mechanism that will perform printing processing, it becomes possible for the host device to perform appropriate processing such as immediately stopping the transmission of print data in the event there is a problem with the printing processing, thus improving data integrity. It is desirable that the interface circuit, which manifests off-line or on-line, notify the host device. This facilitates real-time processing by the hardware, thus further enhancing data integrity.

The data from the host device includes a first command type for selecting the printing mechanism to perform printing processing and a second command type for selecting the printing mechanism that is the subject of inquiry from the host regarding its state, and the printing mechanism selection means may select a printing mechanism based on the first and second command types. This makes it possible to independently select the printing mechanism to perform printing processing and the printing mechanism whose state is to be provided to the host device, which makes it possible to notify the host device of the state of one printing mechanism even during printing processing of another printing mechanism. Therefore, since the state of other printing mechanisms can be considered when determining the next printing processing, jobs can be efficiently allocated. The printing mechanism selector selects a printing mechanism based on the last received command of said first and second command types. This is to accommodate processing in the printer.

In the present invention, error processing performed according to the selected printing mechanism assumes printing processing is performed by the host device. The printing device of the present invention performs printing processing based on data received from a host device and comprises first and second printing mechanisms each equipped with independent printer heads and that perform printing on mutually differing types of recording mediums, first and second error state detection means that detect the respective error states of said first and second printing mechanisms, a printing mechanism selection means that selects one printing mechanism of said first and second printing mechanisms based on the data from the host device to perform printing processing, and an error processing means that performs error processing according to the corresponding printing mechanism based on the error sate of said printing mechanism selected by said printing mechanism selection means. If an error should occur in the printing mechanism performing printing processing, then it becomes possible to quickly perform error processing suited to said printing mechanism. Also, if an error state should occur in a printing mechanism not involved in printing processing, that error processing is not performed immediately. This makes it possible to prevent interruption of printing processing and realize efficient printing processing.

In the present invention, it is desirable that the data from the host device include a command to select the recording medium, the printing mechanism selection means have a correspondence table that stores the correspondence between the printing mechanism and the recording medium on which it prints, the first printing mechanism be selected when the recording medium to be printed on by the first printing mechanism is selected by the command, and the second printing mechanism be selected when the recording medium to be printed on by the second printing mechanism is selected by the command. This makes it possible to maintain compatibility at the command level with earlier printer devices that use a single printing mechanism, thus allowing the host device to control the printer device without recognizing the difference between printing mechanisms.

This invention is described above in apparatus terms, but the present invention also encompasses a corresponding control method yielding the same action and effectiveness described in detail hereinbelow.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

Figure 1:
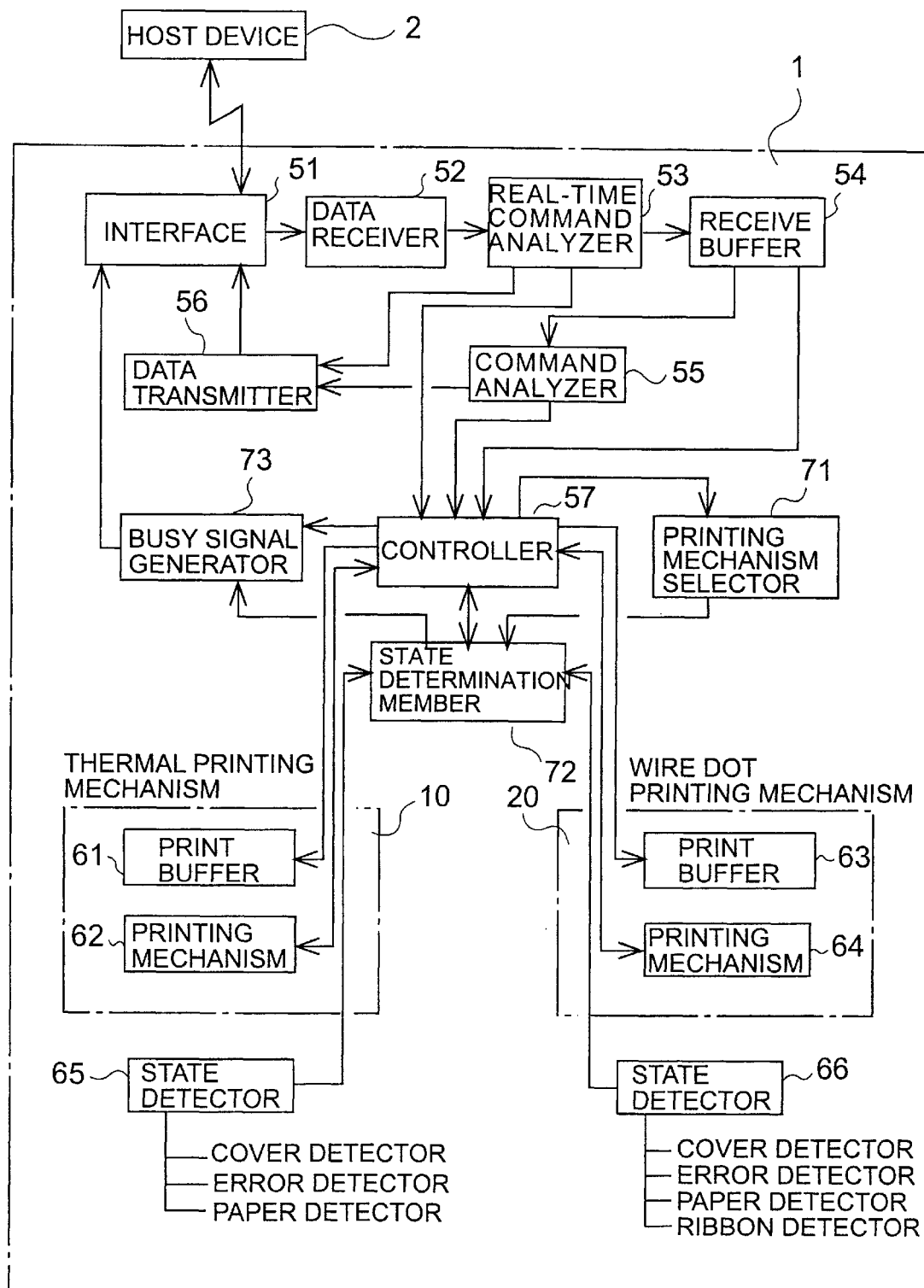
FIG. 1 is a block diagram showing the major components of the control configuration of the hybrid printer of an embodiment of the present invention.
Figure 3:
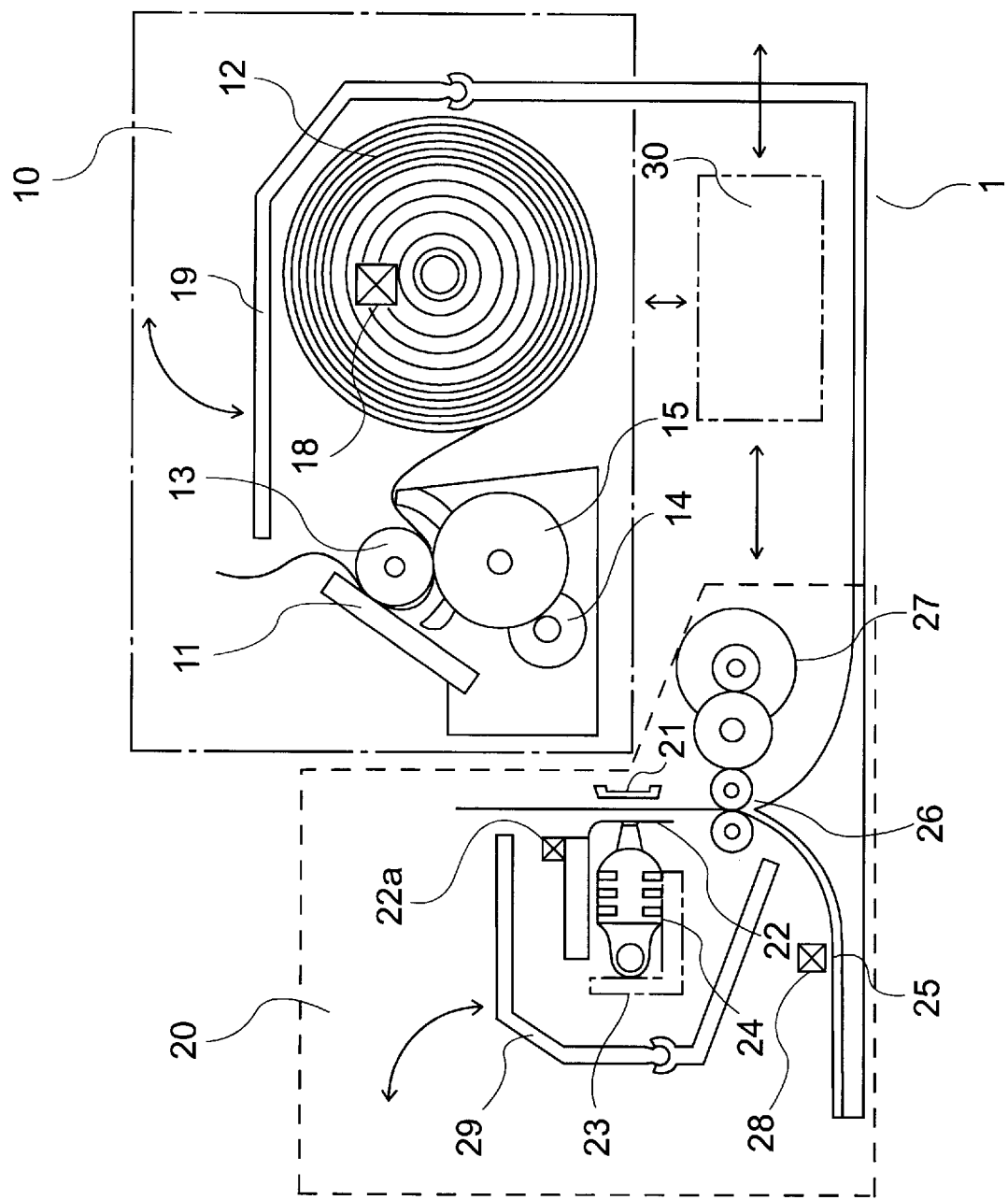
FIG. 3 is a cross section showing the major components of the printing mechanisms of a hybrid printer of the present invention.

A preferred embodiment of the invention is described below using, by way of example, hybrid printer 1 comprising thermal printing mechanism 10 and wire dot printing mechanism 20 shown in FIG. 3. As shown in FIG. 1, hybrid printer 1 of the present invention is connected to host device 2 and operates based on data transmitted from host device 2. Hybrid printer 1 comprises interface 51 connected to host device 2, and when data is received at interface 51, an interrupt is generated and data receiver 52 receives the data from interface 51. The data obtained from interface 51 passes through real-time command analyzer 53 during interrupt processing, and after real-time commands are analyzed, they are stored in receive buffer 54.

When real-time command analyzer 53 recognizes a real-time command in the data from data receiver 52, it causes a pre-defined process to be executed based on the command. Thus, when host device 2 sends a real-time command, the real-time command is analyzed before being transferred to receive buffer 54, and the process determined by the real-time command, such as changing the printing paper selection or sending the status data of the hybrid printer to the host device via data transmitter 56, can be immediately executed by controller 57.

Data stored in receive buffer 54 after passing through real-time command analyzer 53 is extracted one piece of data at a time and analyzed by command analyzer 55, and if the analyzed data code is a control command, then the processing corresponding to that command is executed by controller 57. When the result of analysis is not a control command but rather print data, the printing mechanism is specified using the recording-medium/printing-mechanism correspondence shown in Table 1. The printing mechanism is selected based on the type of paper, e.g., slip form or customer receipt, specified in the paper selection command received in advance from host device 2. After the data has been developed into printing image data by a character generator or other known device, it is stored in the print buffer of the printing mechanism selected. For example, when data to be printed on a customer receipt appears in receive buffer 54, it is stored in print buffer 61 of thermal printing mechanism 10, and when data to be printed on a slip form appears in receive buffer 54, it is stored in print buffer 63 of wire dot printing mechanism 20.

TABLE 1

Recording Medium/Printing Mechanism Correspondence

| Recording Medium | Printing Mechanism | |
|---|---|---|
| | Thermal | Wire Dot |
| Slip Form Paper | | ✓ |
| Customer Receipt Paper | ✓ | |
| Journal Paper | ✓ | |
| Validation | | ✓ |

When the above data generation and storage reaches a prescribed amount, controller 57 controls printing mechanism 62 or 64 of thermal printing mechanism 10 or wire dot printing mechanism 20 and prints the data in respective print buffer 61 or 63. Each printing mechanism has a conventional configuration comprising a printer head, paper feed mechanism, paper cutter, inking device, and other components.

Figure 2:
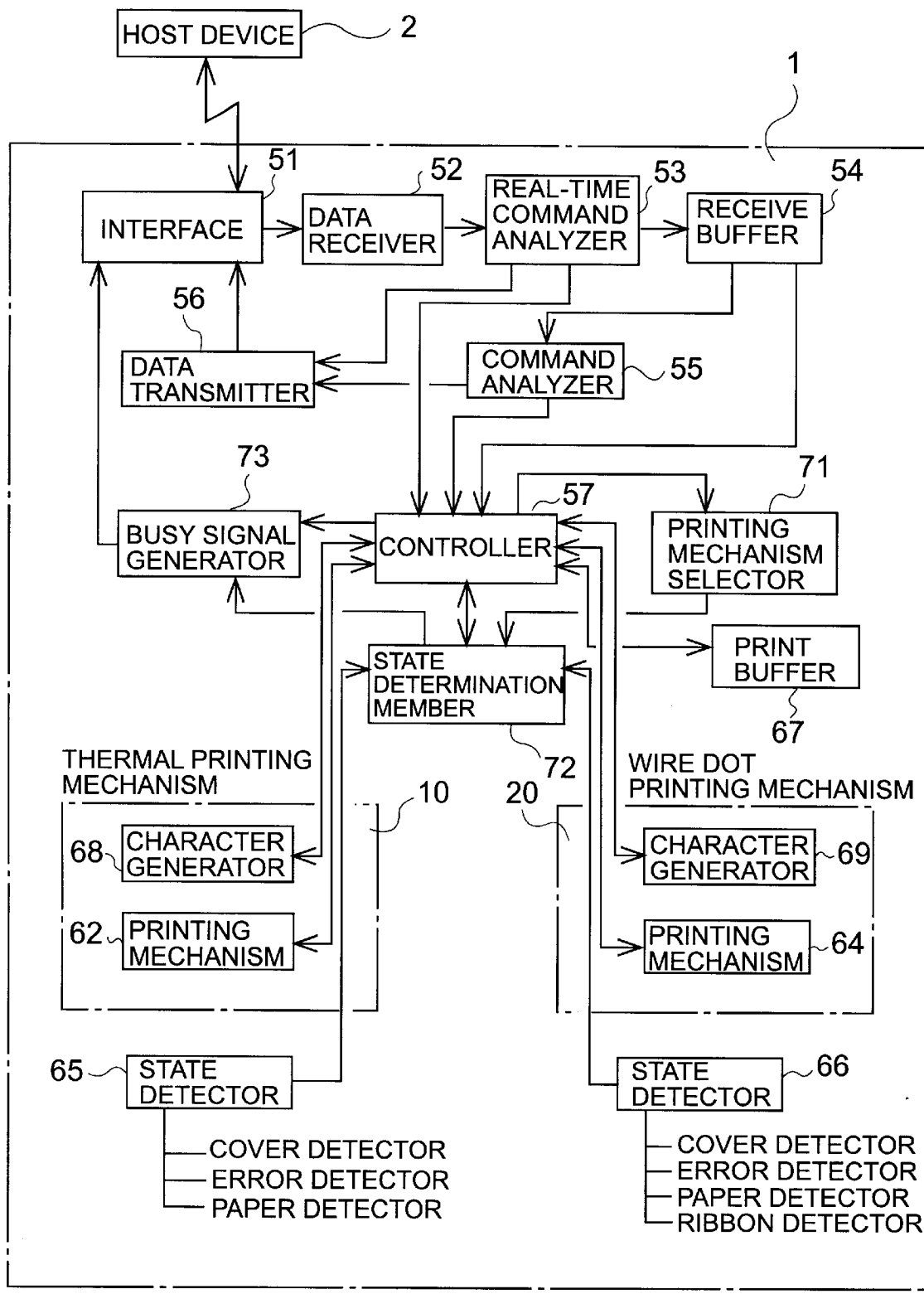
FIG. 2 is a block diagram showing the major components of the control configuration of the hybrid printer of another embodiment of this invention.

A print buffer is provided for each printing mechanism in the embodiment of FIG. 1, but the invention is not limited to this, and as described below, when the printing processing by each printing mechanism is not performed in parallel, the invention can be realized by using a common print buffer 67, as shown in FIG. 2. That is, until the printing processing of one printing mechanism is completed, printing processing using another printing mechanism, including the generation of print data, is kept in a standby state. If the printing mechanisms are different, the printer head configurations will be different and the number of dots making up one character will be different, in which case it is desirable to provide each printing mechanism with a character generator. In FIG. 2, thermal printing mechanism 10 is provided with character generator 68 and wire dot printing mechanism 20 is provided with character generator 69, which are each used to generate image data from the character data.

At the time of print data generation, controller 57 notifies state determination member 72, which performs error processing and state determination as described below, that printing is in progress. Notification is performed by setting a prescribed flag, for example. Hybrid printer 1 of this embodiment is controlled such that thermal printing mechanism 10 and wire dot printing mechanism 20 do not perform printing processing at the same time in order to keep the required power supply capacity at a minimum.

Hybrid printer 1 of this embodiment also has thermal printer state detector 65 and wire dot printer state detector 66, each of which detects the respective states of thermal printing mechanism 10 and dot printing mechanism 20. Thermal printer state detector 65 which detects the state of thermal printing mechanism 10 is configured such that it can detect when cover 19 of thermal printing mechanism 10 is opened and closed, paper jams and other errors, and the end of a paper roll by means of near-end detection sensor 18 shown in FIG. 3. Wire dot printer state detector 66 which detects the state of wire dot printing mechanism 20 is configured such that it can detect when cover 29 of wire dot printing mechanism 20 is opened and closed, errors such as paper jams and overheating of print head 24, presence of slip forms by means of paper sensor 28 shown in FIG. 3, and the end of the ribbon by ribbon sensor 22a shown in FIG. 3.

These detection results are stored in a predetermined memory area such as a RAM in a form of status information as shown in Tables 2 to 4. Table 2 shows a continuous paper status byte which represents the status of the continuous paper to be printed by thermal printer mechanism 10, and Tables 3 and 4 show the slip status byte and validation status byte representing the status of the slip paper and validation paper, respectively, both printed by wire dot printer mechanism 20.

In Table 2, bit 2 and bit 3 of the continuous paper status byte respectively represent detection results of so called near-end of the journal paper and receipt paper which are rolled paper, where near-end is represented as "1". Bit 5 and bit 6 represent run-out conditions of the corresponding paper. In Tables 3 and 4, bit 3 represents paper insertion wait condition of the respective cut sheet paper, and bit 5 and bit 6 the presence or absence of the paper.

TABLE 2

Continuous paper detector status

| Bit | Function | Value 0 | 1 |
|---|---|---|---|
| 0 | Reserved | Fixed to 0 | |
| 1 | Reserved | Fixed to 1 | |
| 2 | Journal near-end detector | Paper loaded | No Paper |
| 3 | Receipt near-end detector | Paper loaded | No Paper |
| 4 | Reserved | Fixed to 1 | |
| 5 | Journal end detector | Paper loaded | No Paper |
| 6 | Receipt end detector | Paper loaded | No paper |
| 7 | Reserved | Fixed to 0 | |

TABLE 3

Slip status

| Bit | Function | Value 0 | 1 |
|---|---|---|---|
| 0 | Reserved | Fixed to 0 | |
| 1 | Reserved | Fixed to 1 | |
| 2 | Slip paper selection | Selected | Not selected |
| 3 | Slip paper insertion wait-state | Waiting | Not waiting |
| 4 | Reserved | Fixed to 1 | |
| 5 | Slip paper detector | Paper loaded | No paper |
| 6 | | | |
| 7 | Reserved | Fixed to 0 | |

TABLE 4

Validation status

| Bit | Function | Value 0 | 1 |
|---|---|---|---|
| 0 | Reserved | Fixed to 0 | |
| 1 | Reserved | Fixed to 1 | |
| 2 | Validation paper selection | Selected | Not selected |
| 3 | Validation paper insertion wait-state | Waiting | Not waiting |
| 4 | Reserved | Fixed to 1 | |
| 5 | Validation paper detector | Paper loaded | No paper |
| 6 | | | |
| 7 | Reserved | Fixed to 0 | |

Table 5 shows an off-line cause status byte which represents the factors causing the hybrid printer to be in the off-line state where a busy signal of the printer is asserted. Bit 2 in the status byte represents the cover open/closed condition of the selected one of the printer mechanisms. Since the hybrid printer goes into an off-line state in accordance with the cover condition of the selected printer mechanism as will be explained below, the cover condition of the selected printer mechanism is set in bit 2. Bit 3 represents whether a paper feed is performed in response to a switch operation by the operator. This bit is also set in accordance with the paper feed in the selected printer mechanism. Bit 5 represents that the printing stops because of a paper run-out condition. The bit automatically represents the state of the selected printer mechanism. Further, bit 6 is set to "1" when a mechanical error such as a paper jam carriage motion error has occurred. In the present embodiment, the bit is set in accordance with the mechanical error condition in the selected printer mechanism.

TABLE 5

Off-line cause status

| Bit | Function | Value 0 | 1 |
|---|---|---|---|
| 0 | Reserved | Fixed to 0 | |
| 1 | Reserved | Fixed to 1 | |
| 2 | Cover status | Closed | Open |
| 3 | Form feed by form feed switch | Form feed not in progress | Form feed in progress |
| 4 | Reserved | Fixed to 1 | |
| 5 | No paper: printing stopped | Printing not stopped | Printing stopped |
| 6 | Mechanical Error status | No error | Error generated |
| 7 | Reserved | Fixed to 0 | |

The status information is sent to the host device in response to a request from the host device or a change in a certain predetermined state of the hybrid printer. That is, the information representing the individual printer mechanisms such as the continuous paper status byte and slip status byte, which do not conflict, are sent for both printer mechanisms. On the other hand, the off-line cause status byte which may conflict among the printer mechanisms is sent in accordance with the selected printer mechanism.

When the hybrid printer asserts the off-line state by activating the busy signal, there may remain some control commands not yet executed. And, in such a case, the status request command should be sent as a real-time command, thus forcing the hybrid printer to perform status reporting irrespective of the presence of the preceding data stored in the receive buffer 54.

State detectors 65 and 66 transmit information to state determination member 72 when there is a change in the state of printing mechanisms 10 and 20 as indicated by these sensors. Further, state determination member 72 is notified which printing mechanism is selected by printing mechanism selector 71. Therefore, state determination member 72 is able to determine the state of printing mechanisms 10 and 20 from printing mechanism state detectors 64 and 66 and also determine whether or not a printing mechanism is printing by notification from controller 57, thus making it possible to determine the error processing that should be performed in hybrid printer 1 of this embodiment. State determination member 72 of this embodiment will perform the following error processing according to the selected printing mechanism when it is detected that the cover of either printing mechanism 10 or 20 has been opened.

When it has been detected that the cover of thermal printing mechanism 10 has been opened while thermal printing mechanism 10 is selected and is performing printing processing; that is, when printing mechanism selector 71 has selected thermal printing mechanism 10 based on data from the host device specifying customer receipt paper, processing of the data in print buffer 61 after the cover is opened cannot be continued and processing of data received in receive buffer 54 cannot proceed. This causes a busy signal to be output from busy signal generator 73, which prompts host device 2 via interface 51 to stop data transfer. Hereinafter, this operation is called off-line processing. It also stops printing processing upon completion of the line being printed. When the cover is closed, it is treated as an automatic recovery error and printing is automatically restarted from the line that was being printed and on-line processing which the busy signal is cleared is performed.

Figure 5:
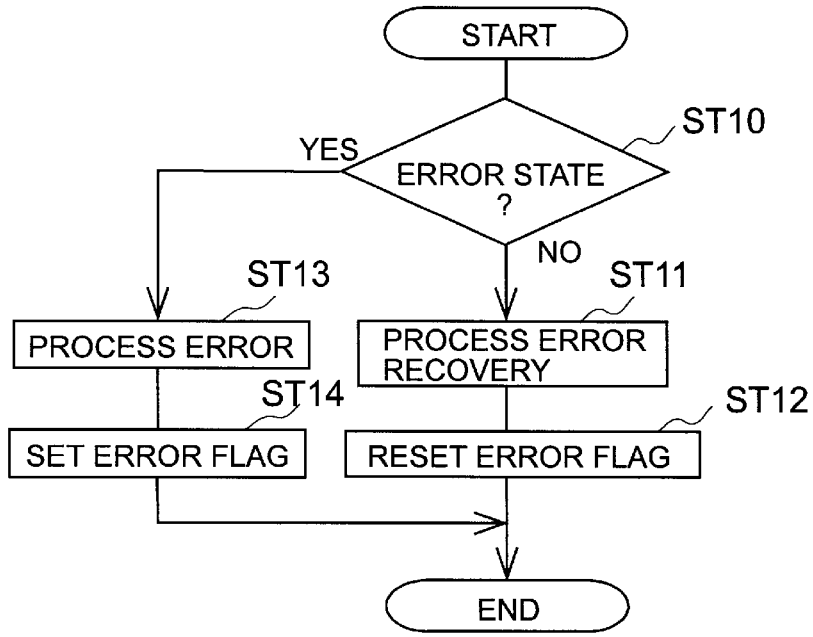
FIG. 5 is a flowchart showing error processing of the thermal printing mechanism of the hybrid printer shown in FIG. 1.

The error processing is described based on the flowchart in FIG. 5. When an error state resulting from an open cover is detected in ST10, the error processing is performed in ST13 and an error flag corresponding to the thermal printing mechanism is set in ST14. When it is detected in ST10 that the cover has been closed and recovery from the error state has occurred, recovery processing that restarts printing is performed in ST11 and the error flag is reset in ST12.

Figure 4:
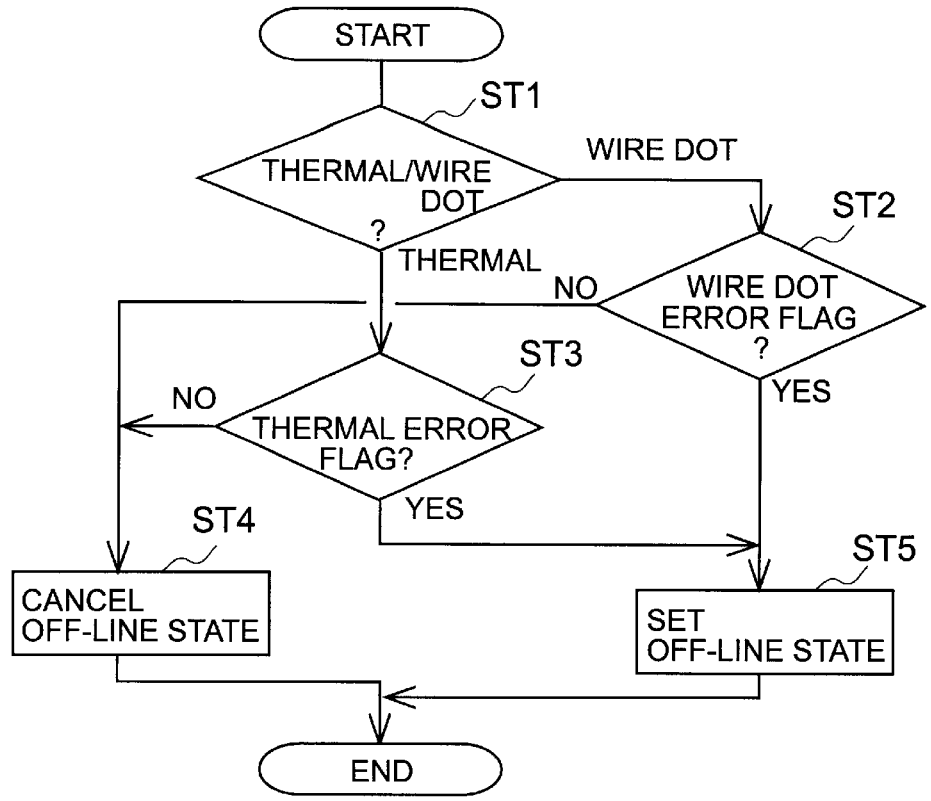
FIG. 4 is a flowchart showing notification control of the off-line state of the hybrid printer shown in FIG. 1.

The processing for setting a printer mechanism off-line is performed according to the flowchart shown in FIG. 4. That is, the printing mechanism is determined in ST1. When the thermal printing mechanism is selected, the thermal printer error flag is checked in ST3. If the corresponding flag is set, the off-line processing is performed in ST5. When the error flag is reset in ST3, the off-line state is canceled in ST4 and is immediately set to an on-line state.

When an open cover is detected in wire dot printing mechanism 20, on the other hand, and wire dot printing mechanism 20 is performing printing processing; that is, printing mechanism selector 71 has selected wire dot printing mechanism 20 based on data from the host device selecting slip forms, it is necessary to immediately stop printing and retract printer head 24 to the standby position since platen 21 is pressed against printer head 24 by the open cover. Also, even if the platen is not affected by the opening of the cover, it is desirable to quickly stop printing processing after completion of printing of the current line in order to ensure accurate printing processing. Therefore, data in print buffer 63 can no longer be processed and processing of data received in receive buffer 54 cannot proceed. This causes a busy signal to be output from busy signal generator 73, which prompts host device 2 via interface 51 to stop data transfer. Also, since wire dot printing mechanism 20 prints on slip forms, it is necessary to locate the printing position. Therefore, even if the cover is closed, automatic recovery is not performed and is treated as a recoverable error, and printing is only resumed and the busy signal cleared when a reset command is sent from the host device.

Figure 6:
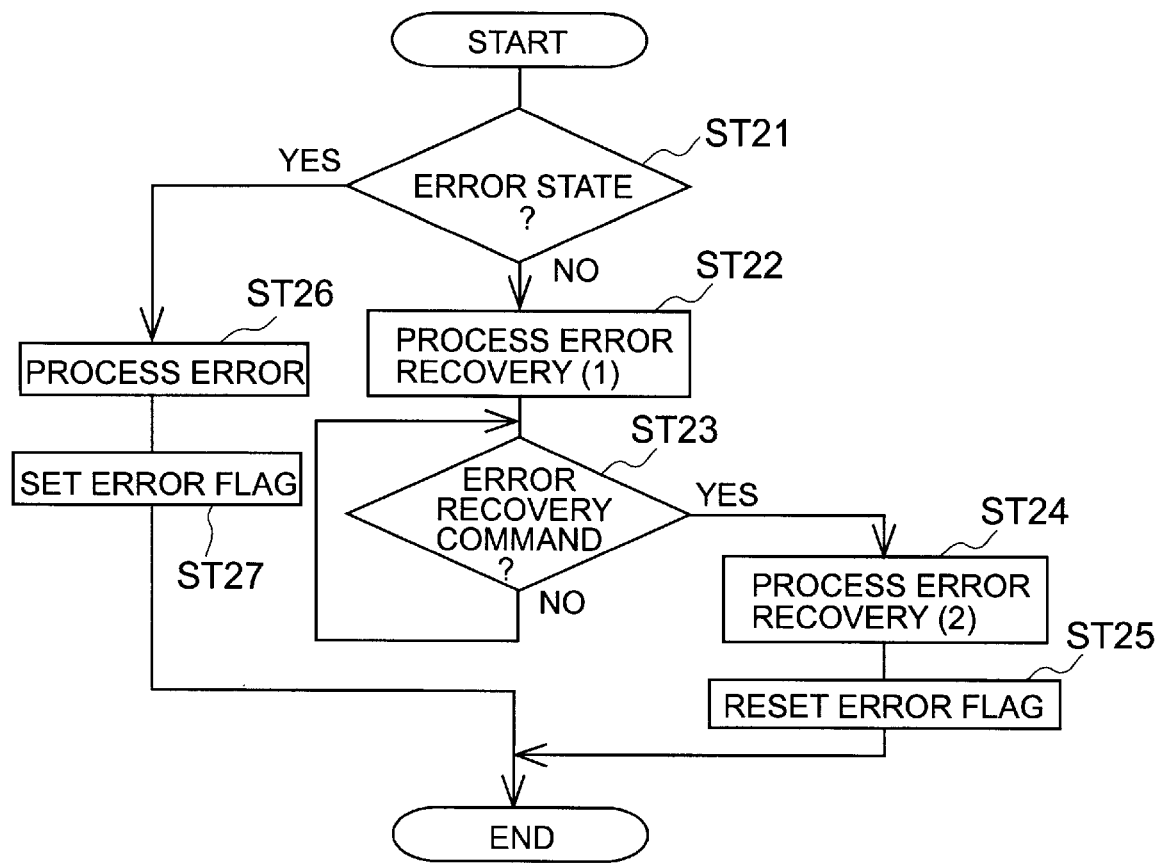
FIG. 6 is a flowchart showing error processing of the wire dot printing mechanism of the hybrid printer shown in FIG. 1.

The error processing for wire dot printing mechanism 20 is shown in the flowchart in FIG. 6. When an error state such as an open cover is detected in ST21, the error processing is performed in ST26. An error flag is also set. This flag is referenced in later processing of an off-line state. Also, when a closed cover is detected in ST21, recovery processing (1) such as detecting the home position of the carriage is performed in ST22. Also, in ST23, the printer device waits for an error recovery command to be sent from the host device, and after it is received, printing is restarted in recovery processing (2) in ST24 and the error flag is reset in ST25.

The processing for setting a printer mechanism off-line is performed according to the flowchart in FIG. 4. The printing mechanism is selected in ST1. When the wire dot printing mechanism is selected, the error flag is checked in ST2. When the flag is set, the off-line processing is performed in ST5. When the error flag is reset in ST2, the off-line state is canceled in ST4, i.e., an on-line state is set.

As can be seen in the flowchart in FIG. 4, even if an error flag is set in the non-selected printing mechanism, the host device is not notified of an off-line state. That is, even if an open cover is detected in thermal printing mechanism 10 or wire dot printing mechanism 20 and the error flag is set, a busy signal is output in hybrid printer 1 if the respective printer mechanism 10 or 20 is selected.

The reason why a busy signal may be output from busy signal generator 73 is not limited to the above situations, but rather such reasons may include the receive buffer being full, which situation is indicated via controller 57 in hybrid printer 1. In this case a busy signal is output to the host device via interface 51 regardless of which printing mechanism is selected.

In the above embodiments, the printer mechanism selection is realized by using a control command received from the host device designating a recording medium to be printed and referring to the look-up table defining a relationship between the recording media and printer mechanisms. However, in this case, while printing on one recording medium, it is impossible for the host device to obtain state information regarding the other printer mechanism. To solve this problem, in another embodiment explained below, a second recording medium selection command for designating a recording medium for which the states of a printer mechanism are to be reported to the host device is introduced.

An example of the control command for designating a recording medium is shown below.

ESC c 0 n

Where "ESC c 0" represents a function of the control command, and "n" is used to point to a certain recording medium. When n equals 0, the receipt paper is designated. The journal paper, slip paper, and validation paper are respectively designated by n=1, n=2 and n=4. When command analyzer 55 detects the code "ESC c 0", it selects a recording medium to be printed based on the value of n. Then, the printer mechanism is selected though the aforementioned table look-up process. The selection result is stored in the memory such as a RAM in the hybrid printer, and retrieved when required.

An example of the control command for designating a printer mechanism whose states are to be reported to the host device is shown below.

ESC c 1 n

The command structure as well as the parameter "n" is the same as in the above control command for designating a recording medium. The selection of the printer mechanism by this control command is also stored in the memory, and looked-up by printer control routines in reporting the state information to the host device. That is, in the flowchart of FIG. 4, the selection of the printer mechanism stored in the memory is checked at ST1, and then the corresponding flag is checked at either ST2 or ST3.

Further, the ESC c 1 n control command can be also used to designate a recording medium for which control values are to be set. By utilizing this control command, host device can obtain state information regarding one printer mechanism and then set or alter the control value used by a printer mechanism controller to perform printing on the designated recording medium while the other printer mechanism is printing on the other recording medium.

It is preferable to perform the printer mechanism selection by using both of above control commands. In this case, a printer mechanism is selected in accordance with the one of the above two control commands executed last. Thus, when a recording medium to be printed is selected, the corresponding printer mechanism can be automatically selected as one whose state information is to be sent to the host device. Alternatively, it is possible for the host device to request the hybrid printer report the states of one of the printer mechanisms which is not performing printing while the other one of the printer mechanisms performs printing.

As described above, in hybrid printer 1 of the present invention, the state of each printing mechanism mounted in the printer is continuously detected, the printing mechanism in an operating state is determined, and error processing appropriate to the operating printing mechanism is quickly performed. Therefore, in addition to being able to prevent problems specific to the printing mechanism such as a burned out printer head, the optimum error processing for the selected printing paper can be performed.

Further, in hybrid printer 1 of the present invention, it is possible to detect the printing mechanism that is the cause of a busy signal. For example, a busy signal is output only when command data indicating customer receipt paper is input to printing mechanism selector 71 and a cause for a busy signal occurs in thermal printing mechanism 10 or, and when command data indicating slip form paper is input to printing mechanism selector 71 and a cause for a busy signal occurs in wire dot printing mechanism 20. This makes it possible to efficiently utilize the printing mechanisms mounted on hybrid printer 1. For example, if the cover is opened during printing on thermal printing mechanism 10, error processing appropriate to thermal printing mechanism is performed and a busy signal is output. In this situation, when a first type of command that selects slip form paper or a second type of command that requests the state of the printing mechanism corresponding to slip form paper is then input from host device 2 by means of real-time commands, printing mechanism selector 71 selects wire dot printing mechanism 20 based on either type of command. This results in the busy signal being canceled according to the flowchart shown in FIG. 4 and facilitates the transfer of data for slip form printing from host device 2 to hybrid printer 1 and slip form printing or its preparation. As described above, hybrid printer 1 of this embodiment makes it possible to effectively utilize a plurality of printing mechanisms by allowing a printing mechanism to be used normally even if a problem has occurred in another printing mechanism and that printing mechanism is not selected.

Since the hybrid printer of the present invention allows the detection of the state of each printing mechanism, appropriate error processing can be performed for the printing mechanism in operation. Also, since the causes of a busy signal can be detected separately for each printing mechanism, the printing mechanism wherein there is no cause for a busy signal can receive data from the host device and perform printing processing. Therefore, even if one printing mechanism cannot be used for whatever reason, it is still possible to use the other printing mechanism, thus making it possible to take full advantage of the functions of the hybrid printer.

In the explanation of the present invention an open cover was used as an example of a cause for an error state, but the same is true for other factors such as overheating of the head, a carriage malfunction, a cutting malfunction by the automatic cutter and detection of a paper-out condition or a worn-part condition. Since the various factors can be detected for each printing mechanism, the hybrid printer can be controlled by accurately selecting error processing suited to both the cause and to the printing mechanism. Further, the operation or non-operation of the respective printing mechanisms is judged based on paper selection information in the above embodiment, but operation and non-operation information can be obtained directly from the respective printing mechanisms.

As described above, the hybrid printer and its control method of the present invention relate to a printer device whereon a plurality of printing mechanisms are mounted and are configured such that changes in the state of each printing mechanism can be detected and the printing mechanism selected for operation can be evaluated. Therefore, it is possible to select error processing appropriate to changes in the state of the printing mechanisms and to their operating state, thus making it possible to prevent damage to the printing mechanisms while facilitating optimal error processing for the printing paper. Further, since it is possible to notify the host device of the state of each printing mechanism by means of a busy signal, the plurality of printing mechanisms mounted on a hybrid printer can be effectively utilized.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. Printer device for performing printing processing based on data received from a host device, comprising:

first and second printing mechanisms each equipped with independent printer heads for printing on mutually differing types of recording mediums;

first and second state detection means for detecting respective states of said first and second printing mechanisms;

printing mechanism selection means for selecting one printing mechanism of said first and second printing mechanisms based on said data received from said host device;

state determination means responsive to said first and second state detection means for determining a state of the printer device selected by said printing mechanism selection means; and state notification means for notifying said host device of the state of said printer device determined by said state determination means.

2. Printer device of claim 1, wherein said state determination means determines the state of the printer device based on the state of said first and second printing mechanisms when the states of said first and second printing mechanisms do not conflict with each other.

3. Printer device of claim 1, wherein said printing mechanism selection means selects the printing mechanism to perform printing processing based on command data from said host device and further including analyzer means for analyzing said command data.

4. Printer device of claim 3, wherein said data includes a command to select one of said recording medium types;

said printing mechanism selection means comprises a correspondence table for storing a correspondence between said first and second printing mechanisms and said recording medium types; and wherein said first printing mechanism is selected when a recording medium type corresponding to said first printing mechanism is selected by said command, and said second printing mechanism is selected when a recording medium type corresponding to said second printing mechanism is selected by said command.

5. Printer device of claim 3, wherein said state notification means comprises an interface circuit for indicating one of an off-line and an on-line state for at least one of said first and second printer mechanisms.

6. Printer device of claim 3, wherein said data includes a first command type for selecting the printing mechanism to perform printing processing and a second command type for selecting the printing mechanism that is a subject of inquiry from said host regarding printer mechanism state, and said printing mechanism selection means selects a printing mechanism based on said first and second command types.

7. Printer device of claim 6, wherein said printing mechanism selection means selects a printing mechanism based on a last received command of said first and second command types.

8. Printing device for performing printing processing based on data received from a host device comprising:

first and second printing mechanisms each equipped with independent printer heads for printing on mutually differing types of recording mediums;

first and second error state detection means for detecting respective error states of said first and second printing mechanisms;

printing mechanism selection means for selecting one printing mechanism of said first and second printing mechanisms to perform printing processing based on said data received from said host device; and error processing means for performing error processing in accordance with a detected error state of said printing mechanism selected by said printing mechanism selection means.

9. Printer device of claim 8, wherein said data includes a command to select one of said recording medium types;

said printing mechanism selection means comprises a correspondence table for storing a correspondence between said first and second printing mechanisms and said recording medium types; and wherein said first printing mechanism is selected when a recording medium type corresponding to said first printing mechanism is selected by said command, and said second printing mechanism is selected when a recording medium type corresponding to said second printing mechanism is selected by said command.

10. Control method for controlling a printer device having first and second printing mechanisms each equipped with independent printer heads for printing on mutually differing types of recording mediums based on data received from a host device, comprising:

detecting the respective states of said first and second printing mechanisms, selecting one printing mechanism from said first and second printing mechanisms based on said data received from said host device, determining the state of the printer device based on the state of said printing mechanism selected in said printing mechanism selection step, and notifying said host device of the state of said printer device determined in said state determination step.

11. Control method of claim 10, wherein the state of the printer device is determined in said state determination step based on the state of said first and second printing mechanisms when the states of said first and second printing mechanisms do not conflict with each other.

12. Control method of claim 10, wherein the printing mechanism to perform printing processing is selected in said printing mechanism selection step based on command data from said host device and further including a step of analyzing said command data.

13. Control method of claim 12, wherein said data includes a command to select one of said recording medium types, and said printer mechanism selection step comprises obtaining a correspondence between said first and second printing mechanisms and said recording medium types, selecting said first printing mechanism when a recording medium type corresponding to said first printing mechanism is selected by said command, and selecting said second printing mechanism when a recording medium type corresponding to said second printing mechanism is selected by said command.

14. Control method of claim 12, wherein said data includes a first command type for selecting the printing mechanism to perform printing processing and a second command type for selecting the printing mechanism that is a subject of inquiry from said host regarding printer mechanism state, and a printing mechanism is selected in said printing mechanism selection process based on said first and second command types.

15. Control method of claim 14, wherein a printing mechanism is selected in said printing mechanism selection step based on a last received command of said first and second command types.

16. Control method for controlling a printer device having first and second printing mechanisms each equipped with independent printer heads for printing on mutually differing types of recording mediums and for performing printing processing based on data received from a host device, comprising:

detecting respective error states of said first and second printing mechanisms, selecting one printing mechanism to perform printing processing from said first and second printing mechanisms based on said data received from said host device, and performing error state processing according to the corresponding printing mechanism based on the error state of said printing mechanism selected in said printing mechanism selection step.

17. Control method of claim 16, wherein said data includes a command to select one of said recording medium types, and said printer mechanism selection step comprises obtaining a correspondence between said first and second printing mechanisms and said recording medium types, selecting said first printing mechanism when a recording medium type corresponding to said first printing mechanism is selected by said command, and selecting said second printing mechanism when a recording medium type corresponding to said second printing mechanism is selected by said command.

* * * * *